(12) United States Patent
Page

(10) Patent No.: US 7,747,387 B2
(45) Date of Patent: Jun. 29, 2010

(54) PROVIDING INCREASED NUMBER OF MEASUREMENTS AND DEEPER DEPTH OF INVESTIGATION FROM EXISTING RESISTIVITY TOOL HARDWARE

(75) Inventor: Geoffrey C. Page, Kincardineshire (GB)

(73) Assignee: Baker Hughes Incorporated, Houston, TX (US)

( * ) Notice: Subject to any disclaimer, the term of this patent is extended or adjusted under 35 U.S.C. 154(b) by 128 days.

(21) Appl. No.: 11/781,756

(22) Filed: Jul. 23, 2007

(65) Prior Publication Data

US 2008/0040042 A1   Feb. 14, 2008

Related U.S. Application Data

(60) Provisional application No. 60/836,531, filed on Aug. 9, 2006.

(51) Int. Cl.
*G01V 1/40* (2006.01)
(52) U.S. Cl. .......................................................... 702/7
(58) Field of Classification Search ..................... 702/7; 340/854.3
See application file for complete search history.

(56) References Cited

U.S. PATENT DOCUMENTS

| | | | |
|---|---|---|---|
| 4,216,536 A | 8/1980 | More | 367/83 |
| 5,359,324 A * | 10/1994 | Clark et al. | 340/854.3 |
| RE35,386 E | 12/1996 | Wu et al. | 175/45 |
| 5,869,968 A | 2/1999 | Brooks et al. | 324/338 |
| 5,892,361 A | 4/1999 | Meyer, Jr. et al. | 324/338 |
| 6,211,678 B1 | 4/2001 | Hagiwara | |
| 6,353,321 B1 | 3/2002 | Bittar | |

* cited by examiner

*Primary Examiner*—Tung S Lau
*Assistant Examiner*—Xiuquin Sun
(74) *Attorney, Agent, or Firm*—Mossman Kumar & Tyler PC

(57) ABSTRACT

Resistivity measurements are made with a propagation resistivity tool in a plurality of different modes wherein the antennas may be used as both transmitters or receivers. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

16 Claims, 5 Drawing Sheets

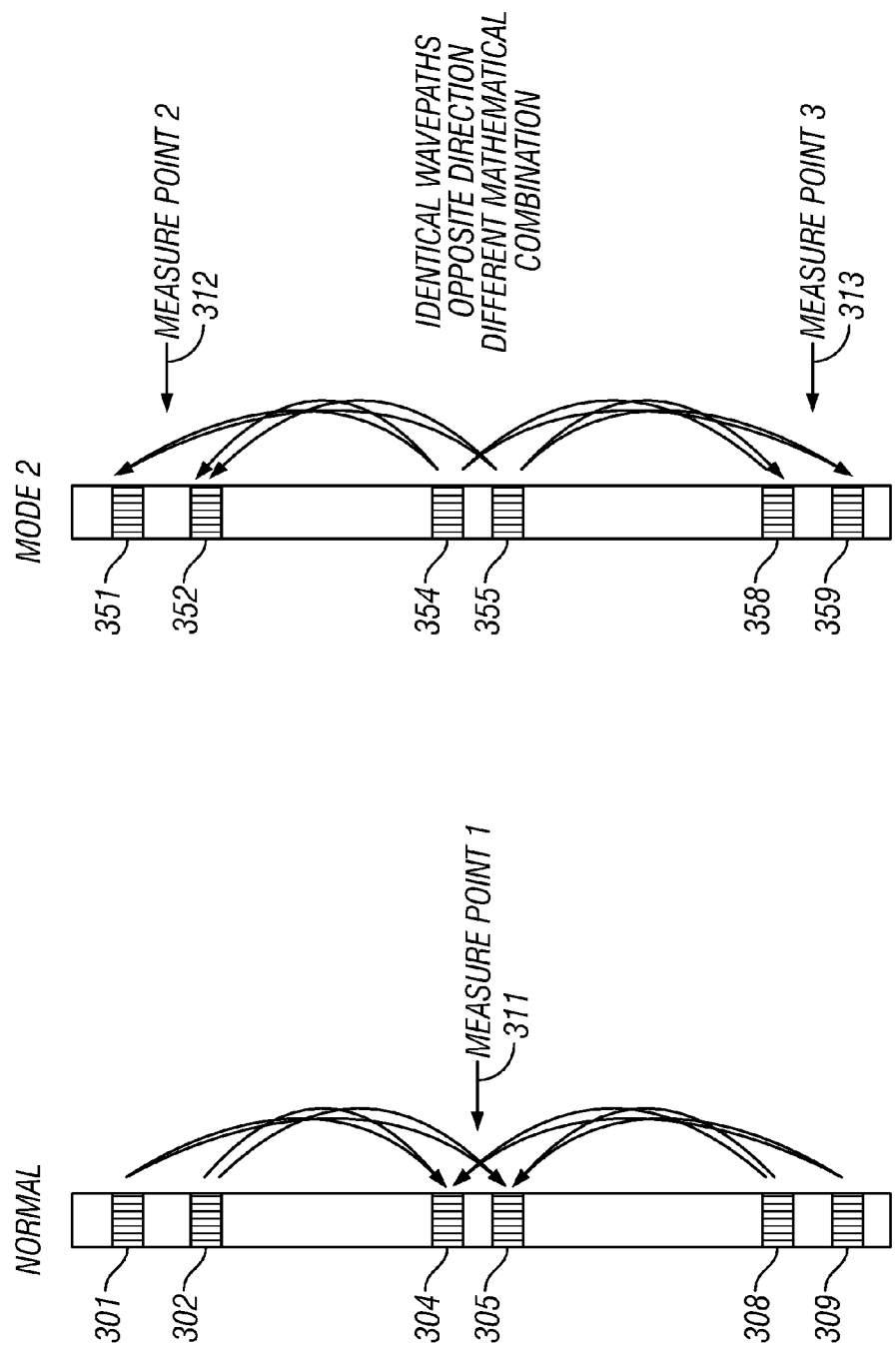

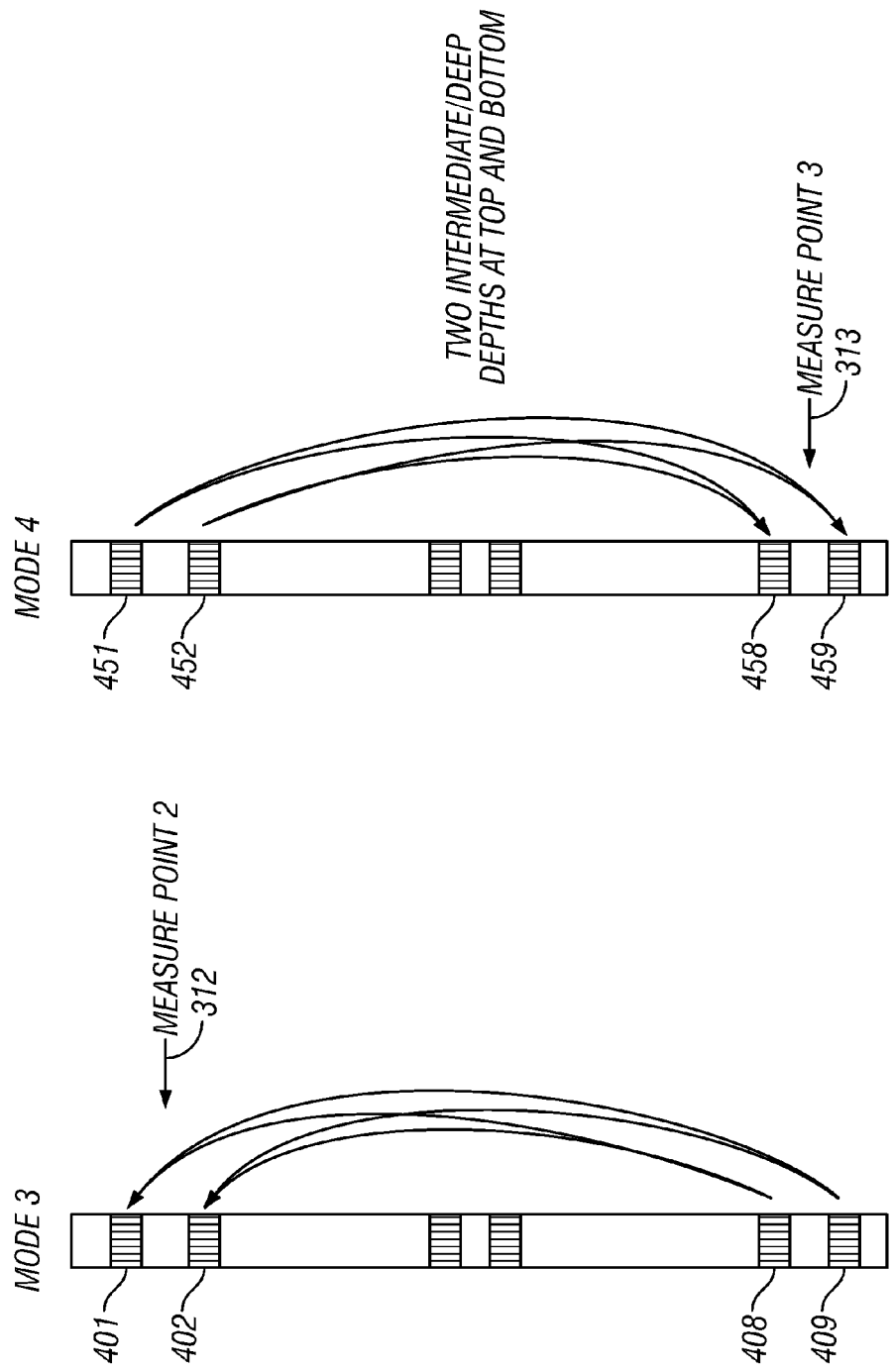

PROVIDING INCREASED NUMBER OF MEASUREMENTS AND DEEPER DEPTH OF INVESTIGATION FROM EXISTING RESISTIVITY TOOL HARDWARE

CROSS-REFERENCES TO RELATED APPLICATIONS

This application claims priority from U.S. Provisional Patent Application Ser. No. 60/836,531 filed on Aug. 9, 2006.

BACKGROUND OF THE DISCLOSURE

1. Field of the Disclosure

The present disclosure relates to obtaining measurements of properties of a formation surrounding a wellbore using a propagation resistivity tool conveyed on a measurement-while-drilling device. In particular, the present disclosure discusses obtaining additional induction measurements at an increased depth of investigation using a propagation resistivity tool.

2. Description of the Related Art

This disclosure relates to the measurement of geophysical parameters of earth formations penetrated by a borehole and more particularly to propagation resistivity measurements at multiple transmitter frequencies and multiple transmitter receiver spacing. Measurements are typically made using an array of four transmitters and two receivers. Elements of the transmitter receiver array are longitudinally and symmetrically spaced along an elongated borehole instrument. Each transmitter induces an alternating voltage into the borehole and the earth formation in the vicinity of the borehole. The amplitudes and phase shifts of the signals produced by these induced alternating electromagnetic fields are measured by the receivers. These signals are affected by numerous formation, near borehole and borehole parameters. The measurements are combined to yield resistivity of the formation, parameters relating to the invasion of drilling fluids into the formation in the near borehole region, and physical characteristics of the borehole itself. The disclosure is directed toward, but not limited to, measurement while drilling (MWD) applications.

A complete description of an exemplary multiple propagation resistivity (MPR) tool is given, for example, in U.S. Pat. No. 5,869,968 to Brooks et al., having the same assignee as the present disclosure and the contents of which are incorporated herein by reference. U.S. Pat. No. 5,892,361 to Meyer Jr. et al, having the same assignee as the present disclosure and the contents of which are incorporated herein by reference, discloses a propagation resistivity measurement-while-drilling device used to measure borehole environmental parameters along with electromagnetic properties of the formation. Multiple transmitter-receiver pairs operating at one or more transmitter frequencies are used to obtain a set of amplitude and phase measurements. A model of the response of the borehole instrument in varying formation and borehole conditions is also utilized. Formation and borehole parameters of interest are selected by the analyst. The measured amplitude and phase data set is then combined with the model of the tool response to obtain the selected parameters of interest.

In one method of operation disclosed in Brooks, each transmitter is sequentially activated while the other transmitter is decoupled to eliminate mutual coupling, and the recorded signals processed to take advantage of reciprocity relations. In another method of operation, both transmitters are operated simultaneously with one relative polarity and then with another relative polarity, to eliminate the effects of mutual coupling and to take advantage of reciprocity relations. The process of compensation and use of the reciprocity relations reduces the redundancy that is inherent in the data. The present disclosure uses the redundancy to advantage and, additionally, is able to provide greater depth of investigation into the earth formation.

SUMMARY OF THE DISCLOSURE

One embodiment of the disclosure is an apparatus for determining a resistivity property of an earth formation. The apparatus includes a logging tool configured to be conveyed into a borehole. The logging tool includes three pairs of antennas on the logging tool, each of the pairs of antennas independently switchable from a transmit mode wherein an electromagnetic wave is generated in the earth formation to a receive mode wherein a signal is produced responsive to a generated electromagnetic wave. The apparatus also includes a processor configured to switch at least one pair of antennas to the transmit mode and generate at least one set of electromagnetic waves, switch at least one pair of antennas to the receive mode and produce at least one set of signals responsive to the at least one set of electromagnetic waves, use the at least one set of signals to make first and second estimates of the resistivity property, and record the first and second estimates of the resistivity property on a suitable medium. The first and second estimates may have different depths of investigation and may correspond to different depths along the borehole. The at least one pair of antennas in the transmit mode and the at least one pair of antennas in the receive mode may define the three pairs of antennas. The processor may be further configured to determine a distance to an interface in the earth formation using the first and second estimates of the resistivity property. The processor may be configured to make the first estimate of the resistivity property using an amplitude and/or a phase of signals at each of the pair of antennas in the receive mode. The at least one pair of antennas in the transmit mode may be below the at least one pair of antennas in the receive mode. The logging tool may be part of a downhole assembly, the apparatus may further include a conveyance device configured to convey the downhole assembly into the borehole, the conveyance device being selected from a drilling tubular and a wireline.

Another embodiment is a method of determining a resistivity property of an earth formation. The method includes conveying a logging tool into a borehole, switching at least one pair of antennas on the logging tool to a transmit mode and generating at least one set of electromagnetic waves, switching at least one pair of antennas on the logging tool to a receive mode and producing at least one set of signals responsive to the at least one set of electromagnetic waves, using the at least one set of signals to make first and second estimates of the resistivity property, and recording the first and second estimates of the resistivity property on a suitable medium. The first and second estimates may be made with different depths of investigation. The first and second estimates may be made at different depths along the borehole. The at least one pair of antennas in the transmit mode and the at least one pair of antennas in the receive mode may define three pairs of antennas. The first and second estimates may be used to determine a distance to an interface in the earth formation. The first estimate may be made using an amplitude and/or a phase at each of the pairs of antennas in the receive mode. The antennas in the transmit mode may be positioned below the antennas in the receive mode. The logging tool may be part of a downhole assembly and the method may include conveying the downhole assembly into the borehole on a drilling tubular or a wireline.

Another embodiment is a computer readable medium for use with an apparatus for determining a resistivity property of an earth formation. The apparatus includes a logging tool configured to be conveyed into a borehole, three pairs of antennas on the logging tool independently switchable from a transmit mode wherein an electromagnetic wave is generated in the earth formation to a receive mode wherein a signal is produced responsive to a generated electromagnetic wave. The medium includes instructions which enable a processor to switch at least one pair of antennas to the transmit mode and generate at least one set of electromagnetic waves, switch at least one pair of antennas to the receive mode and produce at least one set of signals responsive to the at least one set of electromagnetic waves, use the at least one set of signals to make first and second estimates of the resistivity property, and record the first and second estimates of the resistivity property on a suitable medium. The medium may include a ROM, an EPROM, an EEPROM, a flash memory, and/or an optical disk.

BRIEF DESCRIPTION OF THE DRAWINGS

The novel features believed characteristic of the disclosure are set forth in the appended claims. The disclosure itself, however, as well as an exemplary mode of use, further objectives and advantages thereof, will best be understood by reference to the following detailed description of an illustrative embodiment when read in conjunction with the accompanying drawings, wherein:

FIGS. 2A, 2B and 2C illustrate the measurement tool of the present disclosure as used to obtain resistivity measurement; and FIGS. 3A and 3B show an implementation of the measurement tool of the present disclosure to obtain resistivity measurements at an increased depth of investigation.

DETAILED DESCRIPTION OF THE DISCLOSURE

Figure 1A:
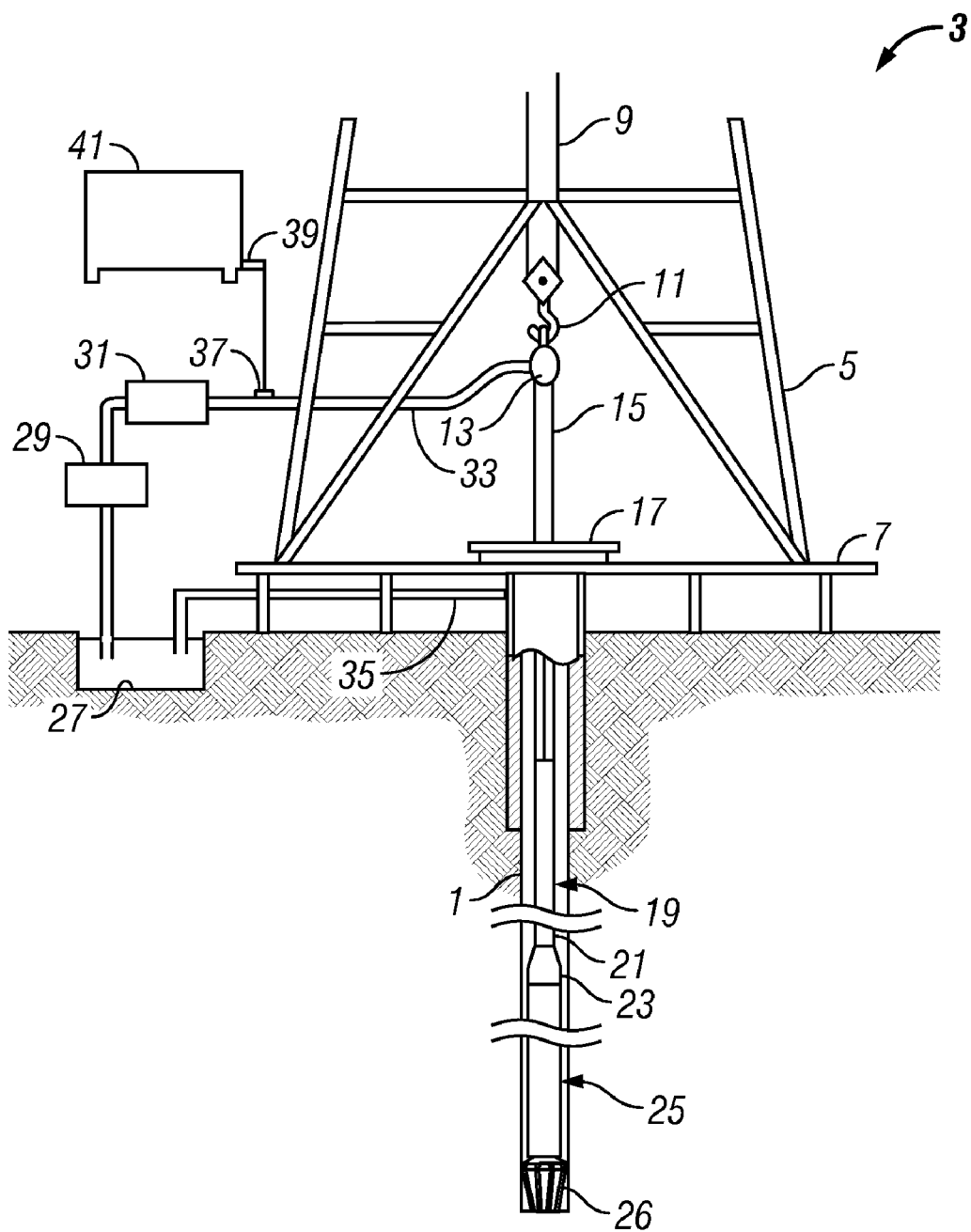
FIG. 1A (Prior Art) describes an overall simultaneous drilling and logging system that incorporates an electromagnetic wave propagation resistivity measurement system according to this disclosure.

With reference to FIG. 1A, there will now be described an overall simultaneous drilling and logging system that incorporates an electromagnetic wave propagation resistivity measurement system according to this disclosure. A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud" as it is commonly called) is circulated from a mud pit 27 through a mud pump 29, past a desurger 31, through a mud supply line 33, and into swivel 13. The drilling mud flows down through the kelly joint and an axial central bore in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

The overall system of FIG. 1A uses mud pulse telemetry techniques to communicate data from downhole to the surface while drilling operations take place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More, which is incorporated herein by reference as if fully set forth, mud pulse telemetry techniques provide for communicating data to the surface about numerous downhole conditions sensed by well logging transducers or measurement systems that ordinarily are located on and within the drill collar nearest the drill bit. The mud pulses that define the data propagated to the surface are produced by equipment within the intermediate sub. Such equipment typically comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of one aspect of this disclosure. As an alternative or supplemental source of electrical power, batteries may be provided, particularly as a back-up for the turbine-driven generator.

A typical measurement system embodying this disclosure includes electronics contained in electronics housings contained within measurement tubular 25, and contains elements arranged in recesses or "necked-down" portions of the tubular steel housing of measurement tubular 25. Some of these elements of measurement tubular 25 include at least one transmitting antenna and at least one intermediate receiving antenna, all of which are carried about an exterior surface of measurement tubular 25, and which are utilized to interrogate the borehole and surrounding formation, as will be discussed in greater detail below.

Figure 1B:
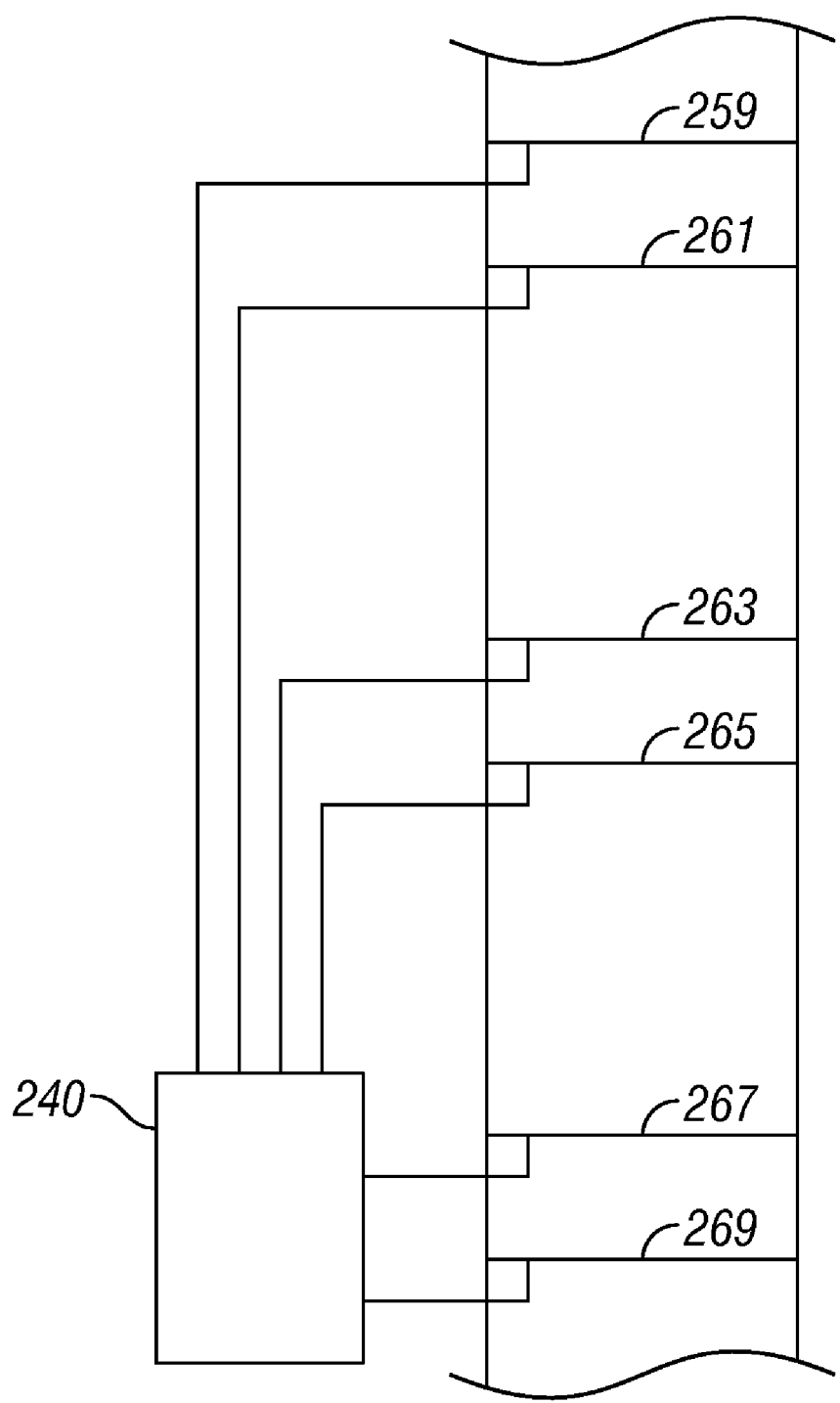
FIG. 1B is a simplified schematic depiction of a possible antenna configuration which may be utilized in accordance with the teachings of the present disclosure.

FIG. 1B illustrates a simplified schematic depiction of a possible antenna configuration conveyed along the drill string 19 which may be utilized in accordance with the teachings of the present disclosure. As is shown, receiving antennas 263, 265 are positioned at a medial location of measurement tubular 25. Transmitting antennas 259, 261 are located at an upper distal portion of measurement tubular 25. Transmitting antennas 267, 269 are located at a lower distal portion of measurement tubular 25. In an exemplary embodiment, the transmitting and receiving antennas are substantially symmetrical about a midpoint which is between receiving antennas 263, 265, although in alternative embodiments an asymmetrical geometry is a viable option. In still other embodiments, a greater number of receiving antennas may be provided. In these embodiments, the transmitting antennas are positioned intermediate the receiving antennas, and the transmitting antennas and receiving antennas are positioned substantially symmetrical about a midpoint although an asymmetrical configuration is also possible.

In one aspect of the disclosure, antennae 259, 261, 263, 265, 267, and 269 comprise transducers, each of which may be operated separately as a transmitter or as a receiver and thus used in various combinations. FIG. 1B shows the transducers used in one possible configuration. Alternatively, the antenna configurations depicted in FIG. 1B may be reversed so that the transmitters are used as receivers and the receivers are used as transmitters. Each transducer may be used either as a transmitter or as a receiver using a selection process, the use of which may be determined via a switch or a logical circuitry 240 connected to each transducer. Thus, various transmitter-receiver combinations may be used with the measurement tool. In addition, each transducer may be turned off as well. Transmitters (or receivers) may be operated separately, in succession, or simultaneously.

Turning no to FIG. 2A, the measurements that may be obtained in the normal mode of a prior art resistivity device are illustrated. With the activation of transmitters 308, 309 and 301, 302 as discussed in Brooks and summarized above, amplitude and phase resistivity measurements are made at a measurement point denoted by 311. FIG. 2B shows a mode of operation identified as mode 2 when the prior art tool is modified. The modification is based on the recognition that the transmitter and receiver antennas and electronics are substantially similar, and by suitable switching circuits (or under processor control) the roles of the transmitter and the receiver can be interchanged. Thus, in FIG. 2B, signals from a pair of transmitters 354, 355 are received at two pairs of receivers 351, 352 and 358, 359. By processing the signals at the receiver pairs, amplitude and phase resistivity measurements are obtained at measurement point 2 (denoted by 312) and at measurement point 3 (denoted by 313).

Those versed in the art would recognize that using the principles of reciprocity, FIG. 2B is equivalent to one in which the receivers are 354, 355, a lower pair of transmitters is at 358, 359 and an upper pair of transmitters is at 351, 352.

Using a combination of modes 1 and 2, it is thus possible to get a resistivity estimate at three different drilling depths. As discussed in U.S. Pat. No. RE35,386 to Wu et al., having the same assignee as the present disclosure and the contents of which are incorporated herein by reference, the resistivity may be indicative of distance to a bed boundary when the logging tool is approaching the boundary at an angle. Thus, having estimates of the resistivity at three different positions provides the geometry of the bed boundary (in terms of the distance from the borehole). For the case where the bed boundary is a fluid interface, the geometry should define a straight line. If the points do not fall on a straight line, a least-squares fitting can be done.

Figure 2C:
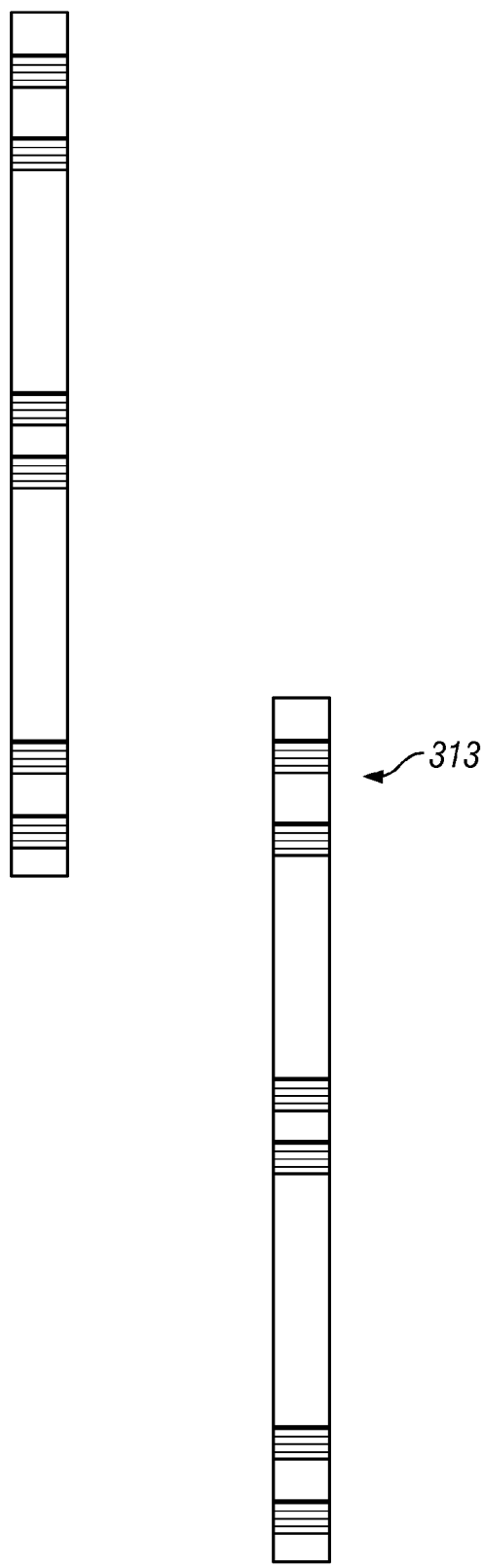

Those versed in the art and having the benefit of the present disclosure would recognize that as the tool is moved, repeat measurements can be obtained at the same depth. This is illustrated in FIG. 2C where the position of the logging tool at an earlier time is shown on the left side and at a later time on the right side after drilling has progressed. Measurements can be obtained with the receivers at the same physical depth 313. In the left side, the measurements in Mode 2 would be obtained with transmitters above the receivers while on the right side, the measurements would be obtained with transmitters below the receivers.

Turning now to FIG. 3A, in another mode of operation of the novel tool of the present disclosure, additional measurements may be obtained at measurement point 2 (denoted by 312) by using 408, 409 as transmitters and 401, 402 as receivers. It should be noted that the measurements made in mode 3 shown in FIG. 3A have a greater depth of investigation (distance radially away from the borehole) than the measurements shown in FIG. 2A (normal mode) and FIG. 2B (mode 1). FIG. 3B shows measurements at measurement point 3 (denoted by 313) when 451, 452 are used as transmitters and 458, 459 are the receivers. This mode 4 has a depth of investigation comparable to mode 3. Those skilled in the art and having benefit of the present disclosure would recognize that FIG. 2C is also representative of measurements made at the same receiver depth using a combination of mode 3 and mode 4.

Thus, using the method of the present disclosure, it is possible to get two resistivity measurements at each logging depth with a shallow depth of investigation into the formation and two resistivity measurements at each logging depth with a larger depth of investigation into the formation.

As can be seen from the figures, all the modes have in common, the switching of at least one pair of antennas to the transmit mode and generating at least one set of electromagnetic waves, switching at least one pair of antennas to the receive mode and producing at least one set of signals responsive to the at least one set of electromagnetic waves, and using the at least one set of signals to make first and second estimates of the resistivity property. The term resistivity property as used here is intended to include formation resistivity, formation conductivity and formation dielectric constant.

The processing of the data may be done by a downhole processor to give corrected measurements substantially in real time. Alternatively, the measurements could be recorded downhole, retrieved when the drillstring is tripped, and processed using a surface processor. It should further be noted that while the description above has been with reference to a bottomhole assembly conveyed on a drill string, the method may also be used with a string of logging instruments conveyed on a wireline. The BHA and the string logging instruments may be referred to as a downhole assembly. Implicit in the control and processing of the data is the use of a computer program on a suitable machine readable medium that enables the processor to perform the control and processing. The machine readable medium may include ROMs, EPROMs, EEPROMs, Flash Memories and Optical disks.

What is claimed is:

1. An apparatus for determining a resistivity property of an earth formation, the apparatus comprising:
    at least three antennas, each of the antennas switchable between a transmit mode wherein an electromagnetic wave is generated in the earth formation and a receive mode wherein a signal is produced responsive to a generated electromagnetic wave; and
    a processor configured to:
    (A) switch a first antenna of the at least three antennas to the transmit mode and generate a first electromagnetic wave,
    (B) switch a second antenna of the at least three antennas to the receive mode and produce a first signal responsive to the first electromagnetic wave,
    (C) switch the first antenna to the receive mode and produce a second signal responsive to a second electromagnetic wave produced by an antenna other than the first antenna,
    (D) use the first signal to make a first estimate of the resistivity property and use the second signal to make a second estimate of the resistivity property, and
    (E) record the first and second estimates of the resistivity property on a suitable medium.

2. The apparatus of claim 1 wherein the first and second estimates have different depths of investigation.

3. The apparatus of claim 1 wherein the first and second estimates correspond to different depths along the borehole.

4. The apparatus of claim 1 wherein the processor is further configured to determine a distance to an interface in the earth formation using the first and second estimates of the resistivity property.

5. The apparatus of claim 1 wherein the processor is configured to make the first estimate of the resistivity property using at least one of: (i) an amplitude, and (ii) a phase, of the first signal.

6. The apparatus of claim 1 wherein the first antenna is below the second antenna.

7. The apparatus of claim 1 wherein the at least three antennas are on a logging tool that is part of a downhole assembly, the apparatus further comprising a conveyance device configured to convey the downhole assembly into the borehole, the conveyance device being selected from the group consisting of: (i) a drilling tubular, and (ii) a wireline.

8. A method of determining a resistivity property of an earth formation, the method comprising:
    switching a first antenna to a transmit mode and generating a first electromagnetic wave;
    switching a second antenna to a receive mode and producing a first signal responsive to the first electromagnetic wave;
    switching the first antenna to a receive mode and producing a second signal responsive to a second electromagnetic wave;
    use the first signal to make a first estimate of the resistivity property and use the second signal to make a second estimate of the resistivity property, and
    recording the first and second estimates of the resistivity property on a suitable medium.

9. The method of claim 8 further comprising making the first and second estimates with different depths of investigation.

10. The method of claim 8 further comprising making the first and second estimates at different depths along the borehole.

11. The method of claim 8 further comprising determining a distance to an interface in the earth formation using the first and second estimates of the resistivity property.

12. The method of claim 8 further comprising making the first estimate of resistivity using at least one of: (i) an amplitude, and (ii) a phase, of the first signal.

13. The method of claim 8 further comprising positioning the first antenna below the second antenna.

14. The method of claim 8 wherein the first antenna and the second antenna are on a logging tool that is part of a downhole assembly, the method further comprising conveying the downhole assembly into the borehole on one of: (i) a drilling tubular, and (ii) a wireline.

15. A computer readable medium accessible to a processor, the computer-readable medium including instructions which enable the processor to:
    switch a first antenna of at least three antennas on a tool to a transmit mode and generate a first electromagnetic wave,
    switch a second antenna of the at least three antennas to a receive mode and produce a first signal responsive to the first electromagnetic wave,
    switch the first antenna to the receive mode and produce a second signal responsive to a second electromagnetic wave produced by an antenna other than the first antenna,
    use the first signal to make a first estimate of the resistivity property and use the second signal to make a second estimate of the resistivity property, and
    record the first and second estimates of the resistivity property on a suitable medium.

16. The machine readable medium of claim 15 further comprising at least one of: (i) a ROM, (ii) an EPROM, (iii) an EEPROM, (iv) a flash memory, and (v) an optical disk.

* * * * *